United States Patent
Wiberg et al.

(10) Patent No.: US 10,743,363 B2
(45) Date of Patent: Aug. 11, 2020

(54) METHODS AND ARRANGEMENTS FOR SUPPORTING BEAM MANAGEMENT IN A WIRELESS COMMUNICATION NETWORK

(71) Applicant: Telefonaktiebolaget LM Ericsson (publ), Stockholm (SE)

(72) Inventors: Niclas Wiberg, Linköping (SE); Håkan Andersson, Linköping (SE); Mattias Frenne, Uppsala (SE); Johan Furuskog, Stockholm (SE); Johan Kåredal, Lund (SE); John Skördeman, Brokind (SE); Tomas Sundin, Sollentuna (SE); Qiang Zhang, Täby (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 374 days.

(21) Appl. No.: 15/747,521

(22) PCT Filed: Nov. 30, 2017

(86) PCT No.: PCT/SE2017/051198
§ 371 (c)(1),
(2) Date: Jan. 25, 2018

(87) PCT Pub. No.: WO2018/128567
PCT Pub. Date: Jul. 12, 2018

(65) Prior Publication Data
US 2020/0084820 A1   Mar. 12, 2020

Related U.S. Application Data

(60) Provisional application No. 62/441,735, filed on Jan. 3, 2017.

(51) Int. Cl.
*H04W 76/19* (2018.01)
*H04B 7/06* (2006.01)
(Continued)

(52) U.S. Cl.
CPC .......... *H04W 76/19* (2018.02); *H04B 7/0617* (2013.01); *H04L 5/0048* (2013.01); *H04W 24/08* (2013.01); *H04W 72/042* (2013.01)

(58) Field of Classification Search
CPC ... H04W 76/19; H04W 24/08; H04W 72/042; H04W 76/18; H04B 7/0617; H04B 7/0626; H04B 7/04; H04L 5/0048
See application file for complete search history.

(56) References Cited

U.S. PATENT DOCUMENTS 9,055,560 B2 * 6/2015 Johansson ............. H04W 76/18
2017/0070937 A1 * 3/2017 Li ........................... H04B 7/04
(Continued)

OTHER PUBLICATIONS

3GPP TSG-RAN WG2 #96; Reno, USA; Source: InterDigital Communications; Title: UE Mobility in Inactive State for NR (Tdoc R2-168462)—Nov. 14-18, 2016.
(Continued)

*Primary Examiner* — Vinncelas Louis
(74) *Attorney, Agent, or Firm* — Baker Botts, LLP

(57) ABSTRACT

A wireless device (120) and a method for initiating a procedure for re-establishing a capability of communication in a wireless communications network (100). The wireless device (120) and a radio network node (110) operate in the wireless communications network (100). The wireless device (120) receives, from the radio network node (110), a first signal that is specific for the wireless device (120). In response to that a certain time has elapsed since a latest receipt of the first signal, the wireless device (120) initiates a procedure for re-establishing a capability of communication between the wireless device (120) and the radio network node (110) using a beam pair.

27 Claims, 8 Drawing Sheets

(51) Int. Cl.
*H04L 5/00* (2006.01)
*H04W 24/08* (2009.01)
*H04W 72/04* (2009.01)

(56) References Cited

U.S. PATENT DOCUMENTS

2018/0007575 A1* 1/2018 Singhal ................. H04L 5/0048
2019/0053072 A1* 2/2019 Kundargi ............. H04B 7/0626

OTHER PUBLICATIONS

PCT Written Opinion of the International Searching Authority for International application No. PCT/SE2017/051198—dated Feb. 15, 2018.
3GPP TSG-RAN WG2 Meeting #96; Reno, USA; Source: MediaTek Inc.; Title: RLM and RLF in HF NR (R2-168130)—Nov. 14-18, 2016.
PCT Notification of Transmittal of the International Search Report and the Written Opinion of the International Searching Authority, or the Declaration for International application No. PCT/SE2017/051198—dated Feb. 15, 2018.
PCT International Search Report for International application No. PCT/SE2017/051198—dated Feb. 15, 2018.
Mobile and Wireless Communications Enablers for the Twenty-Twenty Information Society—II; Deliverable D6.2, 5G Asynchronous Control Functions and Overall Control Plane Design, Version: v1.0—Apr. 30, 2017.

* cited by examiner

METHODS AND ARRANGEMENTS FOR SUPPORTING BEAM MANAGEMENT IN A WIRELESS COMMUNICATION NETWORK

PRIORITY

This nonprovisional application is a U.S. National Stage Filing under 35 U.S.C. § 371 of International Patent Application Serial No. PCT/SE2017/051198 filed Nov. 30, 2017, and entitled "Methods And Arrangements For Supporting Beam Management In A Wireless Communication Network" which claims priority to U.S. Provisional Patent Application No. 62/441,735 filed Jan. 3, 2017, both of which are hereby incorporated by reference in their entirety.

TECHNICAL FIELD

Embodiments herein relate to methods and arrangements for supporting beam management regarding a device operating in a wireless communication network, e.g. a telecommunication network. Especially, embodiments herein relate to a wireless device, a radio network node, and to methods therein for initiating a procedure for re-establishing a capability of communication in the wireless communications network.

BACKGROUND

Communication devices such as wireless communication devices, that simply may be named wireless devices, may also be known as e.g. User Equipments (UEs), mobile terminals, wireless terminals and/or Mobile Stations (MS). A wireless device is enabled to communicate wirelessly in a wireless communication network, e.g. a cellular communications network, which may also be referred to as a wireless communication system, or radio communication system, sometimes also referred to as a cellular radio system, cellular network or cellular communication system. A wireless communication network may sometimes simply be referred to as a network and abbreviated NW. The communication may be performed e.g. between two wireless devices, between a wireless device and a regular telephone and/or between a wireless device and a server via a Radio Access Network (RAN) and possibly one or more Core Networks (CN), comprised within the wireless communication network. The wireless device may further be referred to as a mobile telephone, cellular telephone, laptop, Personal Digital Assistant (PDA), tablet computer, just to mention some further examples. Wireless devices may be so called Machine to Machine (M2M) devices or Machine Type Communication (MTC) devices, i.e. a device that is not necessarily associated with a conventional user, such as a human, directly using the device. MTC devices may be as defined by the 3rd Generation Partnership Project (3GPP).

The wireless device may be, for example, portable, pocket-storable, hand-held, computer-comprised, or vehicle-mounted mobile device, enabled to communicate voice and/or data, via the RAN, with another entity, such as another wireless device or a server.

The wireless communication network covers a geographical area which conventionally is divided into cell areas, wherein each cell area is served by at least one base station, or Base Station (BS), e.g. a Radio Base Station (RBS), which sometimes may be referred to as e.g. "eNB", "eNodeB", "NodeB", "B node", or BTS (Base Transceiver Station), depending on the technology and terminology used. The base stations may be of different classes such as e.g. macro eNodeB, home eNodeB or pico base station, based on transmission power and thereby e.g. also on cell size. A cell is typically identified by one or more cell identities. The base station at a base station site provides radio coverage associated with one or more cells and/or beams. Beams are further discussed below. A cell and beam may thus be associated with geographical areas, respectively, where radio coverage for the cell and beam, respectively, is provided by a base station at a base station site. Cells and/or beams may overlap so that several cells and/or beams cover the same geographical area. By a base station providing or serving a cell and/or beam is meant that the base station provides radio coverage such that one or more wireless devices located in the geographical area where the radio coverage is provided may be served by the base station in said cell and/or beam. When a wireless device is said to be served in or by a cell and/or beam this implies that the wireless device is served by the base station providing radio coverage for the cell and/or beam. One base station may serve one or several cells and/or beams. Further, each base station may support one or several communication technologies. The base stations communicate over the air interface operating on radio frequencies with the wireless device within range of the base stations.

The expression downlink, which may be abbreviated DL, is used for the transmission path from the wireless communication network, e.g. a base station thereof, to the wireless device. The expression uplink, which may be abbreviated UL, is used for the transmission path in the opposite direction i.e. from the wireless device to the wireless communication network, e.g. base station thereof.

In some RANs, several base stations may be connected, e.g. by landlines or microwave, to a radio network controller, e.g. a Radio Network Controller (RNC) in Universal Mobile Telecommunication System (UMTS), and/or to each other. The radio network controller, also sometimes termed a Base Station Controller (BSC) e.g. in GSM, may supervise and coordinate various activities of the plural base stations connected thereto. GSM is an abbreviation for Global System for Mobile Communication (originally: Groupe Special Mobile).

In 3GPP Long Term Evolution (LTE), base stations, which may be referred to as eNodeBs or eNBs, may be directly connected to other base stations and may be directly connected to one or more core networks.

UMTS is a third generation mobile communication system, which may be referred to as 3rd generation or 3G, and which evolved from the GSM, and provides improved mobile communication services based on Wideband Code Division Multiple Access (WCDMA) access technology. UMTS Terrestrial Radio Access Network (UTRAN) is essentially a radio access network using wideband code division multiple access for wireless devices.

General Packet Radio Service (GPRS) is a packet oriented mobile data service on the 2G cellular communication system's global system for mobile communications (GSM).

Enhanced Data rates for GSM Evolution (EDGE) also known as Enhanced GPRS (EGPRS), or IMT Single Carrier (IMT-SC), or Enhanced Data rates for Global Evolution is a digital mobile phone technology that allows improved data transmission rates as a backward-compatible extension of GSM.

High Speed Packet Access (HSPA) is an amalgamation of two mobile telephony protocols, High Speed Downlink Packet Access (HSDPA) and High Speed Uplink Packet Access (HSUPA), defined by 3GPP, that extends and improves the performance of existing 3rd generation mobile telecommunication networks utilizing the WCDMA. Such networks may be named WCDMA/HSPA.

The 3GPP has undertaken to evolve further the UTRAN and GSM based radio access network technologies, for example into evolved UTRAN (E-UTRAN) used in LTE.

Work is ongoing with developing a next generation wide area networks, which may be referred to as NeXt generation (NX), New Radio (NR), or fifth generation (5G). A design principle under consideration for 5G wireless communication networks is to base it on an ultra-lean design. This implies that "always on signals", such as reference signals in LTE, shall be avoided in the network as much as possible. Expected benefits from this design principle include e.g. significantly lower network energy consumption, better scalability, higher degree of forward compatibility, lower interference from system overhead signals and consequently higher throughput in low load scenario, and also improved support for wireless device, or so called user, centric beamforming.

Advanced Antenna Systems (AAS) is an area where technology has advanced significantly in recent years and where we also foresee a rapid technology development in the years to come. Advanced antenna systems in general and massive Multiple Input Multiple Output (MIMO) transmission and reception will likely be used in future wireless communication network and in 5G wireless communication networks.

A beam, such as mentioned above, is traditionally associated with transmission using so called beamforming, typically by means of a phase-adjustable, or phased, antenna array, the same underlying technique is equally applicable to reception. Beamforming, or spatial filtering, may be described as a signal processing technique for directional signal transmission and/or reception. This is typically achieved by combining elements in the phased antenna array, often referred to simply as a phased array, in such a way that signals at particular angles experience constructive interference while others experience destructive interference. Beamforming can be used at both the transmitting and receiving ends in order to achieve spatial selectivity. Thereby, thanks to directivity, improvements are possible to achieve compared with omnidirectional reception/transmission. For example, a transmitter may perform transmit beamforming by transmitting the same signal on all elements of a phased array, except for a per-element weight comprising a phase shift and an amplitude factor. Similarly, a receiver with an phased array, that may be the same and/or configured in the same way as of the transmitter, may perform receive beamforming by applying per-element weights and adding the resulting signals before further processing. The selectivity and directivity may thus be the same in transmission and reception. For transmission, it means that the signal will be stronger in some direction or directions and weaker in others. For reception, it means that signals from some direction or directions are amplified and those from other directions are attenuated, relative to each other. The same antenna may be used, i.e. operated, for transmission and reception although typically not at the same time.

Beams and beamforming may be applied in the uplink and/or downlink, and at both communication ends or only at one communication end. For example, in the downlink regarding communication between a wireless communication network and a communication device, the wireless communication network may uses transmit beamforming and/or the communication device may use receive beamforming. Correspondingly, in the uplink regarding communication between a wireless communication network and a communication device, the wireless communication network may use receive beamforming and/or the communication device may use transmit beamforming. Synonymous naming for transmit beamforming may be transmission beamforming or transmitting beamforming and synonymous naming for receive beamforming may be reception beamforming or receiving beamforming. Conventionally when referring to a beam, a transmit beam is meant, i.e. a radio beam formed and/or generated by transmit beamforming. However, as can be realized from above, it can as well make sense to refer to receive beams, i.e. beams associated with receive beamforming. Herein, "beam" typically refers to a transmit beam if nothing else is indicated, as should be recognized by the skilled person.

A beam provided by a network node is typically for communication with, e.g. for serving, one or a few (compared to a cell) communication devices at the same time, and may be specifically set up for communication with these. The beam may be changed dynamically by beamforming to provide desirable coverage for the one or few communication devices communicating using, e.g. being served by, the beam. A beam provided by a communication device is typically for communication with the wireless communication network, particularly one or a few radio network nodes thereof, typically one, or at least one, that is a main target for the beam.

A transmit beam may be associated with one or more identifiers and/or identities, which may by fix and/or dynamically assigned. There may be identifiers and/or identities that are the same for a set or group of beams, i.e. multiple beams, e.g. corresponding to a cell identity that is the same for all of said multiple beams, e.g. those within a cell, and/or there may be others that identify an individual beam, e.g. an individual beam within a cell or group of beams. A beam identifier and/or beam identity may directly identify the beam, and may e.g. be transmitted in the beam, and/or may indirectly identify the beam, e.g. by referring to the time and/or frequency of a received reference signal transmitted using that beam.

Beamforming improves performance both by increasing the received signal strength, thereby improving the coverage, and by reducing unwanted interference, thereby improving the capacity. Beamforming can be applied both in a transmitter and a receiver of a radio network node and/or wireless device. In a transmitter, beamforming may amount to configuring the transmitter to transmit the signal in a specific direction, or a few directions, and not in other directions. In a receiver, beamforming may amount to configuring the receiver to only receive signals from a certain direction, or a few directions, and not from other directions. When beamforming is applied in both the transmitter and the receiver for a given communication link, the beam pair may be referred to as the beams selected in the both ends. Generally, the beamforming gains are related to the widths of the used beams, where a relatively narrow beam provides more gain than a wider beam.

Beamforming requires some form of beam management, such as beam search, beam refinement, and/or beam tracking, to determine what transmit and receive beams, and e.g. directions thereof, to use for communication between two units, typically between a wireless device and a radio network node, such as a base station. Beam search may involve the transmitter sweeping a signal across several beams, to allow a receiver in an unknown direction to receive the signal. Beam search may also involve the receiver scanning across several receive beams, thereby being able to receive a signal from an initially unknown direction. Beam search typically also involves the receiver sending a message to a transmitter to indicate which transmit beam, or beams, are best suited for transmission to that receiver. Beam refinement and/or tracking is applied when a working beam or beam pair is already selected. Beam refinement is to improve the selected beams, for instance finding a narrower beam that provides a better gain. Beam tracking is to update the selected beam or beams when the conditions change, e.g. due to mobility. Beam refinement and tracking are typically performed by temporarily evaluating a different beam than the one that is currently used for communication, and switching to that beam if it is deemed better than the current.

Beam search may take considerable time, if there are many beams to search on both the transmitter and receiver side, and during this time communication is typically not possible. Beam refinement and tracking are usually ongoing activities that cause little or no disturbance to ongoing communication.

Networks will typically transmit periodic or continuous reference signals to support beam management, e.g. by sweeping across several transmit beams as describe above. Such transmissions are here referred to as Beam Reference Signals (BRS) or simply RS. Some aspects of beam management may then be performed by a wireless device with little or no explicit involvement from the network, since the wireless device may assume that the network is transmitting the BRS periodically or continuously. For instance, wireless device typically perform beam search as part of the system-acquisition procedure, resulting in a selection of a suitable network beam and wireless device beam. Then the terminal performs a random-access transmission using its selected wireless device beam using a transmission resource, associated with certain time and/or frequency, where it is expected that the network is able to receive random-access transmissions using the selected network beam. Wireless devices typically continue to receive BRS even when communication is ongoing, to search for new communication paths and to perform refinement and tracking of currently used beams.

Many wireless communication networks include some kind of radio-link supervision, where the quality of communication is regularly checked, and some action is taken in case the quality is unacceptable or the communication is lost. Radio-link supervision often involves a receiver, e.g. a wireless device or network node, checking the presence and/or quality of a sync signal or a reference signal. It may also involve monitoring a number of retransmissions in a retransmission protocol, and monitoring the time to receive a response to an earlier transmitted request message. In case any of these checks indicate a severe problem, the receiver, e.g. the wireless device or network node, often declares a radio-link failure and initiates some action. In case of a network node having lost communication with a wireless device, the action may involve releasing some or all network resources related to that wireless device. In case of a wireless device having lost communication with a network, the action may involve searching for synchronization and reference signals from the network and, in case such signals are found, attempting to access the network again. In case of a beamforming system, such actions typically involve beam search.

SUMMARY

It is an object to alleviate or at least reduce one or more problems indicated herein.

Hence, the object may be to provide one or more improvements with regard to beam handling or management regarding a device in a wireless communication network.

According to an aspect of embodiments herein, the object is achieved by a method performed by a wireless device for initiating a procedure for re-establishing a capability of communication in a wireless communications network. The wireless device and a radio network node operate in the wireless communications network.

The wireless device receives, from the radio network node, a first signal that is specific for the wireless device.

In response to that a certain time has elapsed since a latest receipt of the first signal, the wireless device initiates a procedure for re-establishing a capability of communication between the wireless device and the radio network node using a beam pair.

According to another aspect of embodiments herein, the object is achieved by a wireless device for initiating a procedure for re-establishing a capability of communication in a wireless communications network. The wireless device and a radio network node are configured to operate in the wireless communications network.

The wireless device is configured to receive, from the radio network node, a first signal that is specific for the wireless device.

The wireless device is configured to initiate a procedure for re-establishing a capability of communication between the wireless device and the radio network node using a beam pair. The wireless device is configured to perform the initiation in response to that a certain time has elapsed since a latest receipt of the first signal.

According to another aspect of embodiments herein, the object is achieved by a method performed by a radio network node for initiating a procedure for re-establishing a capability of communication in a wireless communications network. The radio network node and the wireless device operate in the wireless communications network.

The radio network node sends, to the wireless device, a first signal before a certain time has elapsed since a latest transmission of the first signal, which first signal is specific for the wireless device.

According to another aspect of embodiments herein, the object is achieved by a radio network node for initiating a procedure for re-establishing a capability of communication in a wireless communications network. The radio network node and the wireless device are configured to operate in the wireless communications network.

The radio network node is configured to send, to the wireless device, a first signal before a certain time has elapsed since a latest transmission of the first signal, which first signal is specific for the wireless device.

According to another aspect of embodiments herein, the object is achieved by a computer program, comprising instructions which, when executed on at least one processor, causes the at least one processor to carry out the method performed by the wireless device.

According to another aspect of embodiments herein, the object is achieved by a computer program, comprising instructions which, when executed on at least one processor, causes the at least one processor to carry out the method performed by the radio network node.

According to another aspect of embodiments herein, the object is achieved by a carrier comprising the computer program, wherein the carrier is one of an electronic signal, an optical signal, a radio signal or a computer readable storage medium.

Since the wireless device initiates the procedure for re-establishing the capability of communication between the wireless device and the radio network node using a beam pair, when a certain time has elapsed since a latest receipt of the first signal, the wireless device is triggering the necessary beam management procedure without unnecessary overhead. This results in an improved performance in the wireless communications network.

An advantage of embodiments disclosed herein is that they enable beam-tracking supervision, which allows beam-tracking failure to be quickly detected and beam tracking to be restored.

A further advantage of embodiments disclosed herein is that the use of the certain time, which may be dynamically set, allows the beam-tracking supervision to be done without unnecessary overhead and adapted to the current beam situation.

BRIEF DESCRIPTION OF THE DRAWINGS

The various aspects of embodiments disclosed herein, including particular features and advantages thereof, will be readily understood from the following detailed description and the accompanying drawings, in which FIGS. 1-8 are shown.

FIG. 1 schematically illustrates embodiments of a wireless communications network;

FIG. 2 is a schematic combined flow chart and signalling scheme of embodiments of a wireless communications network;

FIG. 3 is a flowchart depicting embodiments of a method performed by a wireless device;

FIG. 4 is a schematic block diagram illustrating embodiments of a wireless device;

FIG. 5 is a schematic block diagram illustrating embodiments of a network node;

FIG. 7 is a flowchart depicting embodiments of a method performed by a wireless device; and FIG. 8 is a flowchart depicting embodiments of a method performed by a radio network node.

DETAILED DESCRIPTION

Figure 1:
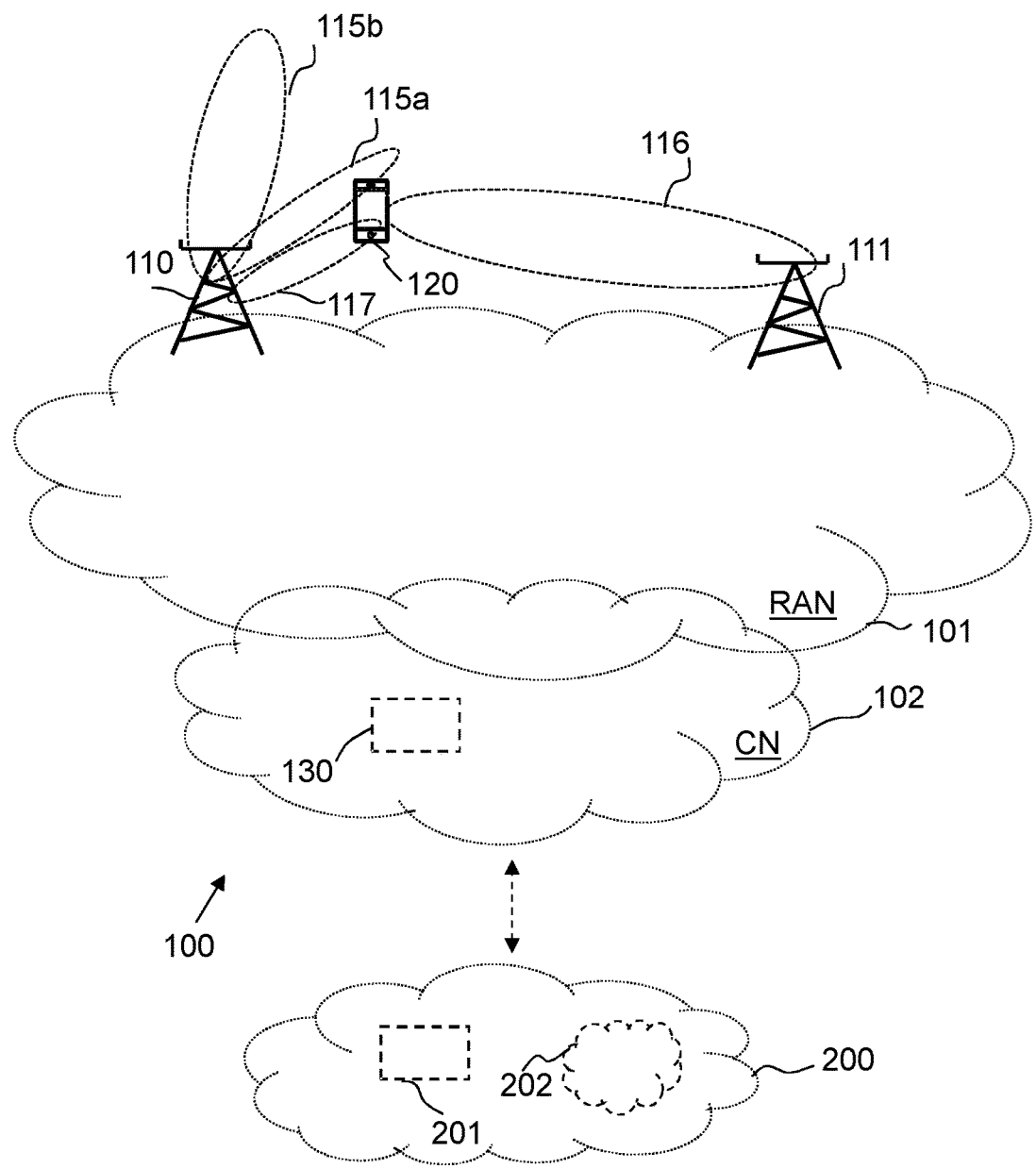

Throughout the following description similar reference numerals may be used to denote similar elements, units, modules, circuits, nodes, parts, items or features, when applicable. In the Figures, features that are optional and therefore appear only in some embodiments are typically indicated by dashed lines.

In the following, embodiments herein are illustrated by exemplary embodiments. It should be noted that these embodiments are not mutually exclusive. Components from one embodiment may be tacitly assumed to be present in another embodiment and it will be obvious to a person skilled in the art how those components may be used in the other exemplary embodiments.

As part of a development towards embodiments herein, the problems indicated in the Background will first further be discussed.

Traditional methods for radio-link supervision as mentioned in the Background are unable or at least not very suitable to detect problems that may occur with beamforming and beam management as described in the Background. For example, a wireless device may be able to receive with good quality a synchronization or reference signal transmitted by a wireless communication network such as a base station on a specific beam, while at the same time communication may be impossible since the wireless communication network such as the base station is using another beam when trying to transmit data or control signals to that wireless device.

FIG. 1 is a schematic block diagram schematically depicting an example of a wireless communication network 100 that is relevant for embodiments herein and in which embodiments herein may be implemented. The wireless communication network 100 may comprise a Radio Access Network (RAN) 101 part and a core network (CN) 102 part. The wireless communication network 100 is typically a telecommunication network or system, such as a cellular communication network that supports at least one Radio Access Technology (RAT), e.g. New Radio (NR) that also may be referred to as 5G.

The wireless communication network 100 comprises network nodes that are communicatively interconnected. The network nodes may be logical and/or physical and are located in one or more physical devices. The wireless communication network 100 comprises one or more network nodes, e.g. a first network node 110, and a second network node 111 that are examples of radio network nodes. A radio network node is a network nodes typically comprised in a RAN, such as the RAN 101, and/or that is or comprises a radio transmitting network node, such as base station, and/or that is or comprises a controlling node that control one or more radio transmitting network nodes.

The wireless communication network 100, or specifically one or more network nodes thereof, e.g. the first network node 110 and the second network node 111, are may be configured to serve and/or control and/or manage and/or communicate with one or more communication devices, such as a wireless device 120, using one or more beams, e.g a downlink beam 115a and/or a downlink beam 115b and/or a downlink beam 116 provided by the wireless communication network 100, e.g. the first network node 110 and/or the second network node 111, for communication with said one or more communication devices. Said one or more communication devices may provide uplink beams, respectively, e.g. the communication device 120 may provide an uplink beam 117 for communication with the wireless communication network 100.

Each beam may be associated with a particular Radio Access Technology (RAT). As should be recognized by the skilled person, a beam is associated with a more dynamic and relatively narrow and directional radio coverage compared to a conventional cell that is typically omnidirectional and/or provides more static radio coverage. A beam is typically formed and/or generated by beamforming and formed and and/or is dynamically adapted based on one or more recipients of the beam, such as one of more characteristics of the recipients, e.g. based on which direction a recipient is located. For example, the downlink beam 115a may be provided based on where the communication device 120 is located and the uplink beam 117 may be provided based on where the first network node 110 is located. As mentioned in the Background, provision of beams and beamforming typically also involves beam management and related procedures, such as beam search, beam refinement and beam tracking. Said beams and beamforming may further be as described elsewhere herein.

Moreover, the wireless communication network 100 may comprise one or more central nodes, e.g. a central node 130 i.e. one or more network nodes that are common or central and communicatively connected to multiple other nodes, e.g. multiple radio network nodes, and may be for managing and/or controlling these nodes. The central nodes may e.g. be core network nodes, i.e. network nodes part of the CN 102.

The wireless communication network, e.g. the CN 102, may further be communicatively connected to, and thereby e.g. provide access for said communication devices, to an external network 200, e.g. the Internet. The communication device 120 may thus communicate via the wireless communication network 100, with the external network 200, or rather with one or more other devices, e.g. servers and/or other communication devices connected to other wireless communication networks, and that are connected with access to the external network 200.

Moreover, there may be one or more external nodes, e.g. an external node 201, for communication with the wireless communication network 100 and node(s) thereof. The external node 201 may e.g. be an external management node. Such external node may be comprised in the external network 200 or may be separate from this.

Furthermore, the one or more external nodes may correspond to or be comprised in a so called computer, or computing, cloud, that also may be referred to as a cloud system of servers or computers, or simply be named a cloud, such as a computer cloud 202 as shown in the figure, for providing certain service(s) to outside the cloud via a communication interface. The exact configuration of nodes etc. comprised in the cloud in order to provide said service (s) may not be known outside the cloud. The name "cloud" is often explained as a metaphor relating to that the actual device(s) or network element(s) providing the services are typically invisible for a user of the provided service(s), such as if obscured by a cloud. The computer cloud 202, or typically rather one or more nodes thereof, may be communicatively connected to the wireless communication network 100, or certain nodes thereof, and may be providing one or more services that e.g. may provide, or facilitate, certain functions or functionality of the wireless communication network 100 and may e.g. be involved in performing one or more actions according to embodiments herein. The computer cloud 202 may be comprised in the external network 200 or may be separate from this.

Attention is drawn to that FIG. 1 is only schematic and for exemplifying purpose and that not everything shown in the figure may be required for all embodiments herein, as should be evident to the skilled person. Also, a wireless communication network or networks that in reality correspond(s) to the wireless communication network 100 will typically comprise several further network nodes, such as core network nodes, e.g. base stations, radio network nodes, further beams, and/or cells etc., as realized by the skilled person, but which are not shown herein for the sake of simplifying.

Device embodiments are exemplified in relation to e.g. FIGS. 1, 2, 3, 4 and 7.

Wireless communication network and network node embodiments are exemplified in relation to e.g. FIGS. 1, 2, 5 and 8.

Note that shown actions may be taken in any suitable order and/or be carried out fully or partly overlapping in time when this is possible and suitable. Dotted lines attempt to illustrate features that are not present in all embodiments.

Any of the actions below may when suitable fully or partly involve and/or be initiated and/or be triggered by another, e.g. external, entity or entities, such as device and/or system, than what is indicated below to carry out the actions. Such initiation may e.g. be triggered by said another entity in response to a request from e.g. the device and/or the wireless communication network, and/or in response to some event resulting from program code executing in said another entity or entities. Said another entity or entities may correspond to or be comprised in a so called computer cloud, or simply cloud, and/or communication with said another entity or entities may be accomplished by means of one or more cloud services.

Figure 2:
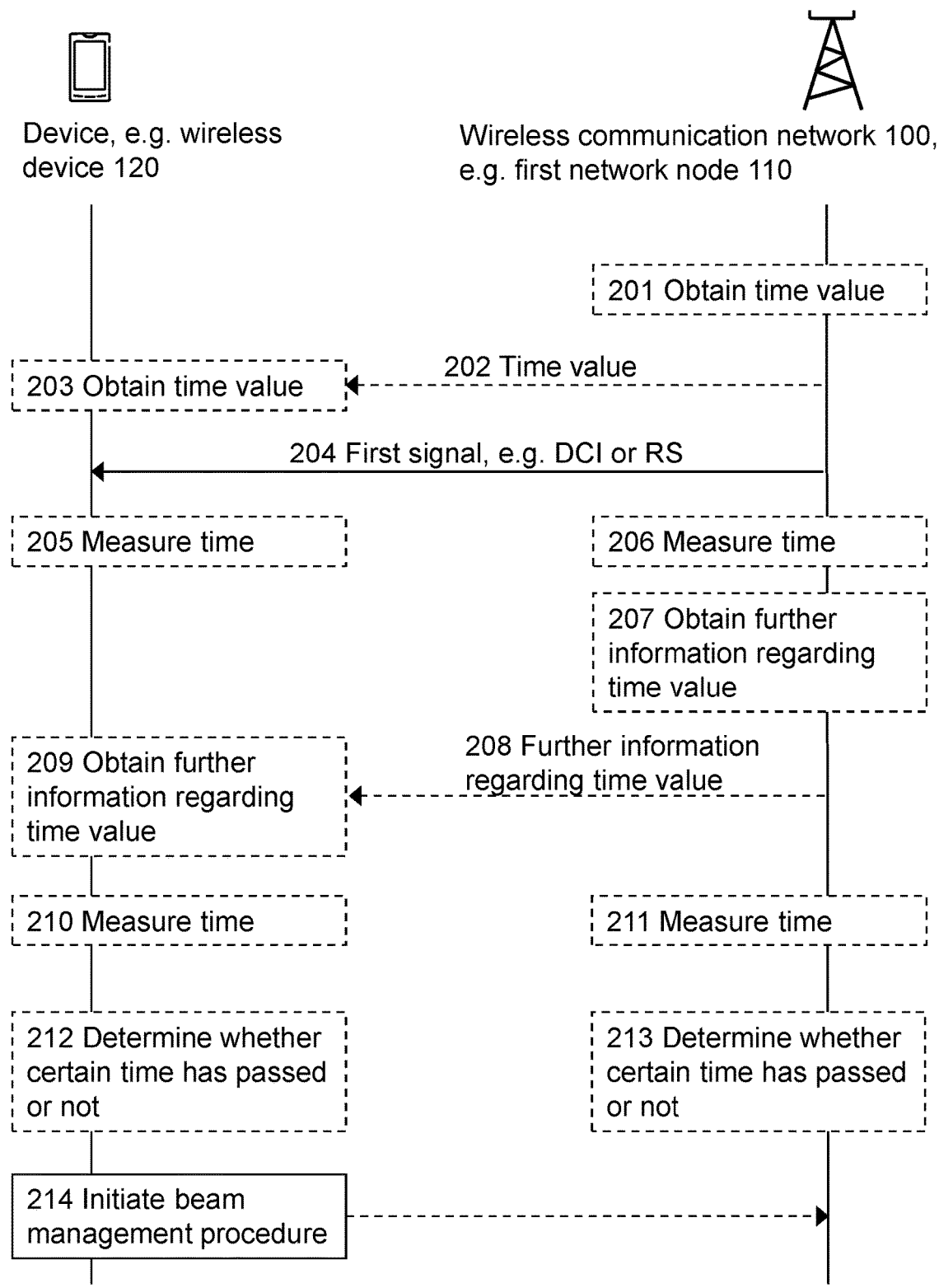

FIG. 2 is a combined signaling diagram and flowchart for schematically illustrating some embodiments herein.

Embodiments herein e.g. comprise:

A first method, performed by a device 400, e.g. the wireless device 120. The method may be for supporting beam handling or management regarding the device in a wireless communication network, e.g. the wireless communication network 100, i.e. when the wireless device 120 is operative in and/or is served by the wireless communication network 100, e.g. by a network node 500 such as the radio network node 110. The method may alternatively be described as a method for triggering, starting or initiating a beam management procedure, such as described below.

The first method comprises one or more of the following actions:

Receiving 204, from the wireless communication network 100, such as from a network node thereof, e.g. the radio network node 110, a first signal such as e.g. a trigger signal. The first signal, is specifically targeted, e.g. that has been sent specifically for receipt by the device 120, 400, and/or that is specific for the device 120, 400 and/or monitored by the device 120, 400.

In some embodiments, the first signal comprises, is or corresponds to a Downlink Control Information (DCI) message, such as a downlink assignment message or uplink grant message, that may be received on a Physical Downlink Control CHannel (PDCCH). A downlink assignment message may be described as a message that indicates a downlink data transmission that the device 120, 400 should attempt to receive. An uplink grant message may be described as a message that indicates that the device should perform an uplink data transmission.

In some embodiments, that may be combined with the above embodiments, the first signal comprises, is or corresponds to a Reference Signal (RS), typically a beamformed RS, that should be a reference signal that are present and/or is monitored by the device regularly, e.g. with a certain periodicity that may be predetermined and/or known by the wireless communication network. The wireless communication network 100, e.g. the network node 110, 500, may configure when the device 120, 400 shall monitor the RS, e.g. by configuring a periodicity for the device. The device may thus know and may expect and/or assume the RS to be available to the device regularly, such as in certain subframes and/or according to the periodicity. The RS may be available independent on whether the device detects a DCI or not at that time, e.g. in the same subframe.

The device 400 and/or the processing module 401 and/or the processing circuit 404 and/or the I/O module 405 and/or the receiving module 407 may be operative, or configured, to perform this action.

The receiving 204 relates to Action 702 that will be described below.

Initiating 214 a beam management procedure, e.g. a beam tracking restore procedure, in response to that a certain time have passed or elapsed since a previous, preferably, latest receipt of said first signal.

The procedure may be described as a procedure for restoring or re-establishing a capability of communication between the device 120, 400 and the wireless communication network 100, e.g. the using one or more beams, typically a selected beam or a selected beam pair, where said one or more beams may be beams formed or generated by the device 120,400, e.g. for uplink communication, and one or more beams may be formed or generated by wireless communication network, e.g. for downlink communication. Said one or more beams may be beams already in use for communication between the device and the wireless communication network, or may be new beams for this purpose, such as beams not already involved in such communication and/or that may be fully or partly unknown to the device and/or wireless communication network. In the latter case with new beams, the procedure typically comprises to first find and/or select the new beams, which may corresponds to a beam search. In both cases the procedure then typically comprises that the device is performing an access, such as by means of a random access transmission, to the wireless communication network using said one or more beams.

In addition to the time passed or elapsed since the previous receipt of said first signal, the initiation of the procedure may be in response to a quality, e.g. quality measure and/or evaluation, of a communication channel associated with the first signal, e.g. a channel that transmits the first signal. When the first signal comprises the RS, the quality is advantageously regarding the RS, e.g. measured for and/or on the RS. The initiation of the procedure is preferably carried out when the quality is considered insufficient, e.g. according to a criteria that may be fully or partly predetermined and/or configured by the wireless communication network. For example, the quality may be compared to a threshold, typically a threshold value, that may be fixed or configurable by the wireless communication network, e.g. by dedicated or general, such as broadcast, signalling. The quality may be averaged during a certain period, e.g. with regard to multiple receipts of the RS and/or during multiple RS receipt intervals or periods, resulting in an average quality, e.g. average quality measure, that may be used with the criteria, e.g. compared to the threshold.

The beam search mentioned above may involve one or more of the following:

the device transmitting a second signal, such as sweeping the second signal across several beams and thereby enabling the wireless communication network, such as one or more network nodes thereof that may be in a yet unknown direction, to receive the second signal and gain knowledge about the device and/or transmitting beams from the device;

the device receiving, from the wireless communication network, e.g. as a result from the device scanning through or across several beams transmitted by the wireless communication network, one or more third signals that are initially, fully or partly, unknown to the device and/or in an unknown direction, thereby enabling the device to gain knowledge about the receiving beams.

The device 400 and/or the processing module 401 and/or the processing circuit 404 and/or the initiating module 410 may be operative, or configured, to perform this action.

The initiating 214 relates to Action 707 that will be described below.

In some embodiments, the first method further comprises one or more of the following actions:

Obtaining 203 a time value. The time value may for example be a timer value for count down as time passes or elapses, typically by being reduced linearly with time as it passes, until the count reaches zero, or a timer value to be counted up to as time passes, such as from zero until the timer value is reached. Another possibility, although it may be of less interest in practice, is a time value corresponding to point in time according to a certain time measuring reference, such Coordinated Universal Time (UTC) or similar.

The time value is advantageously sent by, and thus received from, the wireless communication network, and/or may be predetermined and/or predefined. It may e.g. be defined in a standard. The time value may e.g. be signaled from the wireless communication network in a RRC layer or by a MAC control element.

The device 400 and/or the processing module 401 and/or the processing circuit 404 and/or the I/O module 405 and/or the obtaining module 406 may be operative, or configured, to perform this action.

The obtaining 203 relates to Action 701 that will be described below.

Measuring 205, 210 time from said latest receipt of said first signal.

The device 400 and/or the processing module 401 and/or the processing circuit 404 and/or the measuring module 408 may be operative, or configured, to perform this action.

The measuring 205,210 relate to Actions 703 and 705 which will be described below.

Determining 212 whether said certain time has passed or not based on said obtained time value and the measured time, e.g. based on a count up or count down of the time value as time passes and/or based on comparison between measured time and the time value.

The device 400 and/or the processing module 401 and/or the processing circuit 404 and/or the determining module 409 may be operative, or configured, to perform this action.

The determining 212 relates to Action 706 that will be described below.

Above, the first signal may thus be considered to act as a trigger signal for the measuring and the obtained time value may be considered to correspond to a target for the measuring. Obtaining the time value as above may be considered to correspond to setting a timer and measuring the time as above may be considered operating, or running, the timer. The timer may be referred to as a beam-tracking watchdog timer or simply watchdog timer elsewhere herein. Said certain time may correspond to the time value that may be a timer value. When the first signal is received, or is received and with sufficient quality, before it has been determined that said certain time has passed and the procedure shall be initiated, such as before expiry of the timer, the measuring of time should be restarted, e.g. the timer should be restarted.

In some embodiments, the initiation of the procedure is additionally in response to detection by the device that the wireless communication network is about to switch Network Transmission and Reception Point (TRP) for the device. The device may accomplish this by performing the measurement of time and/or determine that said certain time has passed or not, in response to such detection. In other words, in some embodiments, the initiation of the procedure is only enabled in response to said detection, and/or, in case of said timer, the timer may only be enabled and/or used in response to said detection.

In some embodiments, the first method further comprises one or more of the following actions:

Obtaining 209 further, e.g. updated, information regarding the time value, such as an updated time value. In some embodiments, the updated information is obtained by being received from the wireless communication network. In some embodiments it is obtained by being selected and/or formed and/or generated by the device.

The device 400 and/or the processing module 401 and/or the processing circuit 404 and/or the I/O module 405 and/or the obtaining module 406 may be operative, or configured, to perform this action.

The obtaining 209 relates to Action 704 that will be described below.

Determining 212 whether said certain time has passed or not based on the received further information regarding the time value. For example, the timer may be restarted and/or may apply, e.g. use, a new timer value based on the received further information.

The device 400 and/or the processing module 401 and/or the processing circuit 404 and/or the determining module 409 may be operative, or configured, to perform this action.

The further information may be applied, such as used, directly or at, e.g. in response to, a next receipt of said first signal. In some embodiments, receipt of the further information is receipt of an updated time value that is a different value than the previously obtained time value or than a previously obtained updated time value, and may replace this value.

In some embodiments, receipt of the further information re-starts the time measurement.

Note that in some embodiments, where e.g. the further information is applied directly and receipt of the further information restarts the time measurement, the further information may be an updated time value that is the same value as the previously obtained time value, but which still may be useful since it e.g. makes the time measurement restart and thereby increases time before the beam management procedure may be initiated next.

The determining 212 relates to Action 706 that will be described below.

In some embodiments, the device 120, 400 refrains from initiating the beam management procedure for a desirable period of time, e.g. by stopping the time measurement and/or selecting and/or forming and/or generating certain further information that stops the device to perform said time measurement and/or that will prevent initiation during said desirable period of time. The device 120, 400 may do this when the there is little or no expected traffic regarding the device, e.g. little traffic scheduled in relation to a threshold for this purpose and which threshold may be predetermined.

In some embodiments, the time value and/or the updated time value, are based on and/or is sent based on, e.g. in response to, detection by the device 120, 400 that the wireless communication network 100 is about to, and e.g. will, switch network Transmission and Reception Point (TRP) point for the device 120, 400. When this is the case, i.e. in response thereto, the device may e.g. select and/or form and/or generate an updated time value that results in a shortened time until said beam management procedure is or may be initiated.

A second method, performed by a wireless communication network, e.g. the wireless communication network 100, such as by one or more network nodes 500 thereof, e.g. the radio network node 110. Thus, it should be understood that the actions described below with reference to the wireless communications network 100 may be performed by the network node 500, e.g. the radio network node 110. The method may be for supporting beam handling or management regarding a device 400, e.g. the wireless device 120, in the wireless communication network 100, i.e. when the wireless device 120 is operative in and/or is served by the wireless communication network 100. The method may alternatively be described as method for triggering, starting or initiating a beam management procedure, such as described above.

The second method comprises one or more of the following actions:

Obtaining 201 a time value. The time value may be as described above for the first method. The time value may be obtained internally in the wireless communication network or received from an external source. The wireless communication network may e.g. select and/or form and/or generate the time value. The time value may be predetermined.

The network node 500 and/or the processing module 501 and/or the processing circuit 504 and/or the I/O module 505 and/or the obtaining module 506 may be operative, or configured, to perform this action.

The obtaining 201 relates to Action 801 that will be described below.

Sending 202, to the wireless device 120, 400, the time value. The time value may be sent as described above for the first method.

The network node 500 and/or the processing module 501 and/or the processing circuit 504 and/or the I/O module 505 and/or the sending module 507 may be operative, or configured, to perform this action.

The sending 202 relates to Action 802 that will be described below.

Sending 204, to the device 120, 400, a first signal. The first signal may be and may be sent as described above for the first method, i.e. for example may be the DCI message and/or RS. The first signal may thus be (re-)sent regularly etc.

Further, in some embodiments, the wireless communication network 100 sends the first signal so that the device 120, 400 will avoid to determine that said certain time has passed, e.g. to avoid that the timer expires, just because the wireless communication network 100 has not yet sent the first signal again, e.g. re-sent it. This may e.g. be accomplished by that the wireless communication network 100 re-sends the first signal, if needed, before said certain time have passed or elapsed after the first signal was sent the time before, i.e. the last time. The first signal may in such case not need be sent with any other purpose than this and may thus e.g. be sent only with the purpose to restart the timer of the device. For example, when the first signal is the DCI message, the wireless communication network 100 may schedule the device to accomplish this but the schedule may as such be a dummy scheduling, e.g. a dummy grant.

Hence, the wireless communication network 100 may again send the first signal to the device 120, 400 based on measured time from last time the wireless communication network 100 sent the first signal to the device 120, 400, so that the first signal is sent again, i.e. re-sent, before a certain time has passed. The certain time may be as described above for the first method. The wireless communication network 100 may thus determine when said certain time will occur, and thereby a suitable point in time before this happens, based on the obtained time value and the measured time, e.g. based on a count up or count down of the time value as time passes and/or based on comparison between measured time and the time value.

The network node 500 and/or the processing module 501 and/or the processing circuit 504 and/or the I/O module 505 and/or the sending module 507 may be operative, or configured, to perform this action.

The sending 202 relates to Action 802 that will be described below.

Obtaining 207 further, e.g. updated, information regarding the time value, such as an updated time value. The further information may be as described above for the first method. The further information may be obtained internally in the wireless communication network 100 or received from an external source. The wireless communication network 100 may e.g. select and/or form and/or generate the further information. The further information may be predetermined.

The network node 500 and/or the processing module 501 and/or the processing circuit 504 and/or the I/O module 505 and/or the obtaining module 506 may be operative, or configured, to perform this action.

The obtaining 206 relates to Action 805 that will be described below.

Sending 208, to the device 120, 400, the obtained further information regarding the time value.

In some embodiments, the wireless communication network 100 sends the further information, e.g. updated information that may be said updated time value, in order to restart the time measuring in the wireless communication device 120, 400 and/or to replace a time value in use with another one, so that the device 120, 400 will avoid to determine that said certain time has passed, e.g. to avoid that the timer expires, only because the wireless communication network 100 has not sent the first signal again, i.e. re-sent it. The reason to do this may thus be the same reason as discussed above regarding sending the first signal again. The further information may thus also be sent based on measured time from last time the wireless communication network 100 sent the first signal to the device 120, 400. The wireless communication network 100 may thus also in this case determine when said certain time will occur, and thereby be able to select and/or find a suitable point in time before this happens, based on the obtained time value and measured time, such as based on a count up or count down of the time value as time passes and/or based on comparison between measured time and the time value.

The network node 500 and/or the processing module 501 and/or the processing circuit 504 and/or the I/O module 505 and/or the sending module 507 may be operative, or configured, to perform this action.

The sending 208 relates to Action 806 that will be described below.

In some embodiments, the time value and/or the updated time value, are based on and/or is sent based on expected traffic regarding the device 102, 400, i.e. in downlink and/or uplink. The wireless communication network 100 may e.g. form or select a time value and/or updated time value based on the expected traffic and then send it to the device. Determining expected traffic may e.g. be based on scheduled data and/or buffered data for uplink and/or downlink transmission from/to the device 120, 400. For example, if the amount of buffered data is above a certain value or threshold, that may be predetermined, an updated time value that results in a shortened time until said beam management procedure is or may be initiated, e.g. an updated timer value that is decreased in relation to a timer value already in use, may be sent to the device 120, 400. In another example, an updated time value that results in a shortened time until said beam management procedure is or may be initiated, may be sent to the device 120, 400 when, such as in response to, the expected traffic being reduced or decreased and/or when the device is being less frequently scheduled. Correspondingly, an updated time value that results in a longer time until said beam management procedure is or may be initiated may be sent when, such as in response to, the expected traffic being increased and/or when the device is being more frequently scheduled. The degree of change of the time value, e.g. an increase or decrease, and how it relates to change in expected traffic, may be according to certain criteria that may be predetermined.

In some embodiments, the wireless communication network 100 may control the device so that the beam management procedure will or cannot be initiated by the device 120, 400, at least for a desirable period of time, e.g. by sending certain updated information that stops the device 120, 400 to perform said time measurement and/or by sending a time value that will prevent initiation during said desirable period of time. The wireless communication network 100 may perform this control when the there is little or no expected traffic regarding the device 120, 400, e.g. little traffic in relation to a threshold for this purpose and which threshold may be predetermined.

In some embodiments, the time value and/or the updated time value, are based on and/or is sent based on when, e.g. in response to that, the wireless communication network 100 is about to, and e.g. will, switch network Transmission and Reception Point (TRP) point for the device 120, 400. When this is the case, e.g. when a TRP switch occasion for the device is detected, the wireless communication network 100 may e.g. form or select an updated time value that results in a shortened time until said beam management procedure is or may be initiated, and then send it to the device 120, 400.

Embodiments herein facilitates or even enables beam-tracking supervision and/or allows beam-tracking failure to be quickly detected and beam tracking restored Embodiments herein facilitate and enable more reliable communication where relatively few resources have to be spent on beam management such as beam tracking. Embodiments herein enable dynamic adjustments regarding when beam management is to be initiated and thereby enables beam management and/or related supervision, such as beam-tracking supervision, to be done without unnecessary overhead.

Figure 7:
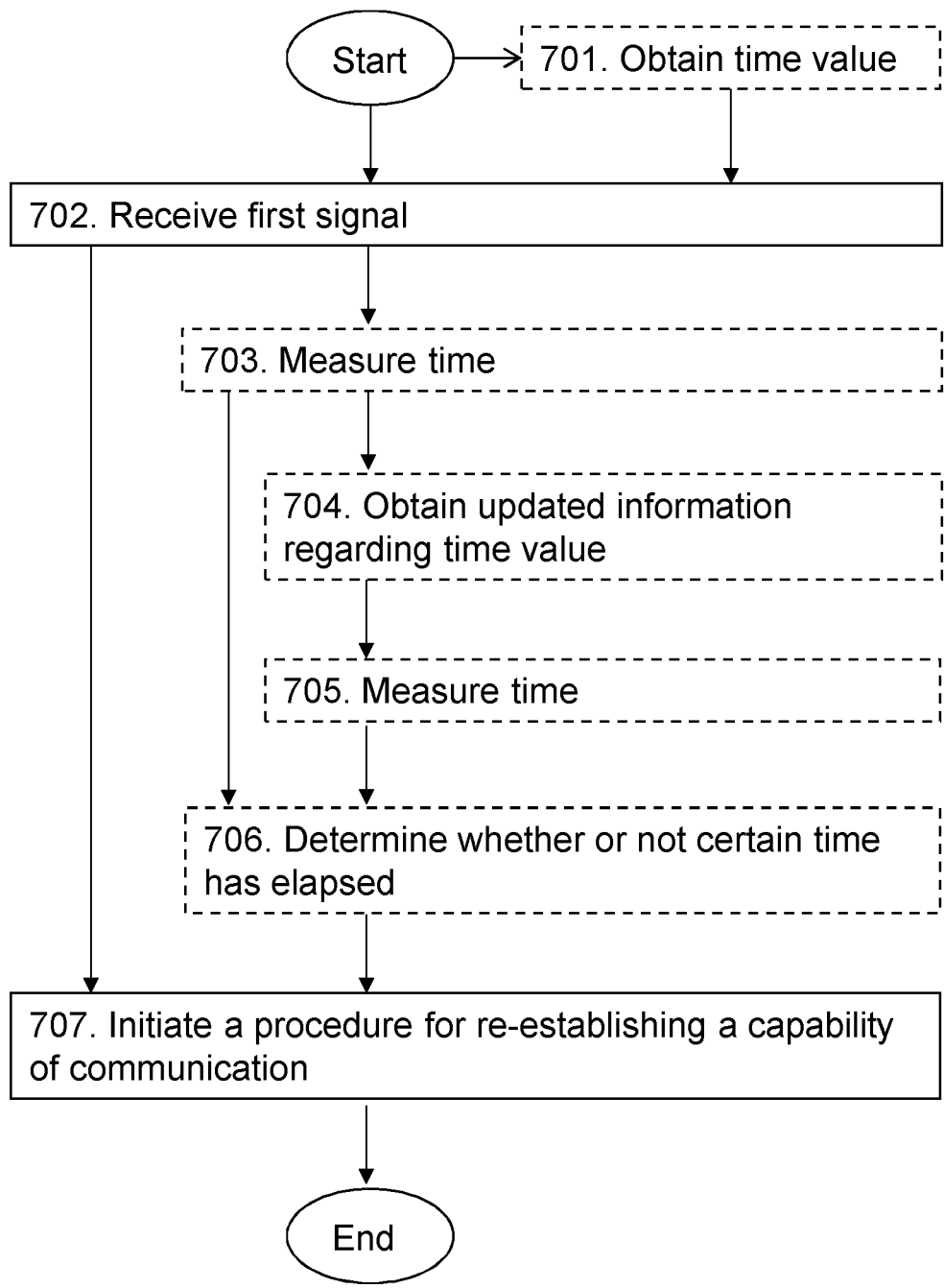

In order to improve the understanding of some embodiments disclosed herein, FIG. 7 will be described before FIG. 3.

An example of a method performed by the wireless device 120 for initiating a procedure for re-establishing a capability of communication in the wireless communications network 100 will now be described with reference to a flowchart depicted in FIG. 7. As mentioned above, the wireless device 120 and the radio network node 110 operate in the wireless communications network 100.

The methods comprise one or more of the following actions. It should be understood that these actions may be taken in any suitable order and that some actions may be combined.

Action 701

In some embodiments, the wireless device 120 obtains a time value. As previously mentioned, the time value may be a time value for count down as time passes or elapses.

The time value may be obtained by the wireless device 120 itself, e.g. the wireless device may be configured with the time value, or the time value may be obtained by the wireless device 120 by receiving it from the network node 110.

For example, the time value may be based on detection that the wireless communications network 100 is about to switch network Transmission and Reception Point (TRP) for the wireless device 120.

Alternatively or additionally, time value may be based on expected traffic to and from the wireless device 120.

This relates to Action 203 previously described.

Action 702

The wireless device 120 receives, from the radio network node 110, a first signal that is specific for the wireless device 120. Thereby, the wireless device 120 knows that communication with the radio network node 110 is possible, e.g. that a beam pair exists, and that it does not have to initiate a procedure for re-establishing a capability of communication with the radio network node 110.

As previously mentioned, the first signal may comprise an DCI message or a Reference Signal.

This relates to Action 204 previously described.

Action 703

In some embodiments, the wireless device 120 measures time from the latest receipt of the first signal. Thereby, the wireless device 120 will know when a certain time has lapsed since a latest receipt of the first signal. As was described in Action 204 above and as will be described in Action 707 below, the wireless device 120 is to initiate a procedure for re-establishing a capability of communication, e.g. establishing or re-establishing a beam pair, with the radio network node 110 if the certain time has elapsed since the latest receipt of the first signal.

This relates to Action 205 previously described.

Action 704

In some embodiments, the wireless device 120 obtains updated information regarding the time value. For example, the updated information regarding the time value may relate to a change in time value, e.g. the time value may be extended or shortened.

The updated information regarding the time value may be obtained by the wireless device 120 itself, e.g. the wireless device may be configured with the updated information regarding the time value, or the updated information regarding the time value may be obtained by the wireless device 120 by receiving it from the network node 110.

For example, the updated information regarding the time value may be based on detection that the wireless communications network 100 is about to switch network Transmission and Reception Point (TRP) for the wireless device 120.

Alternatively or additionally, updated information regarding the time value may be based on expected traffic to and from the wireless device 120.

The receipt of the updated information may restart the time measurement.

This relates to Action 209 previously described.

Action 705

In some embodiments, the wireless device 120 measures time from the latest receipt of the first signal. Thus, in some embodiments, wherein the wireless device 120 has obtained updated information regarding the time value as described in Action 704 above, the wireless device 120 continues to measure time from the reception of the latest receipt of the first signal.

This relates to Action 210 previously described.

Action 706

In some embodiments, the wireless device 120 determines whether or not the certain time has elapsed based on the obtained time value and the measured time.

The wireless device 120 may determine whether or not the certain time has elapsed based on the updated information regarding the time value.

This relates to Action 212 previously described.

Action 707

In response to that a certain time has elapsed since a latest receipt of the first signal, the wireless device 120 initiates a procedure for re-establishing a capability of communication between the wireless device 120 and the radio network node 110 using a beam pair.

This relates to Action 214 previously described.

Figure 3:
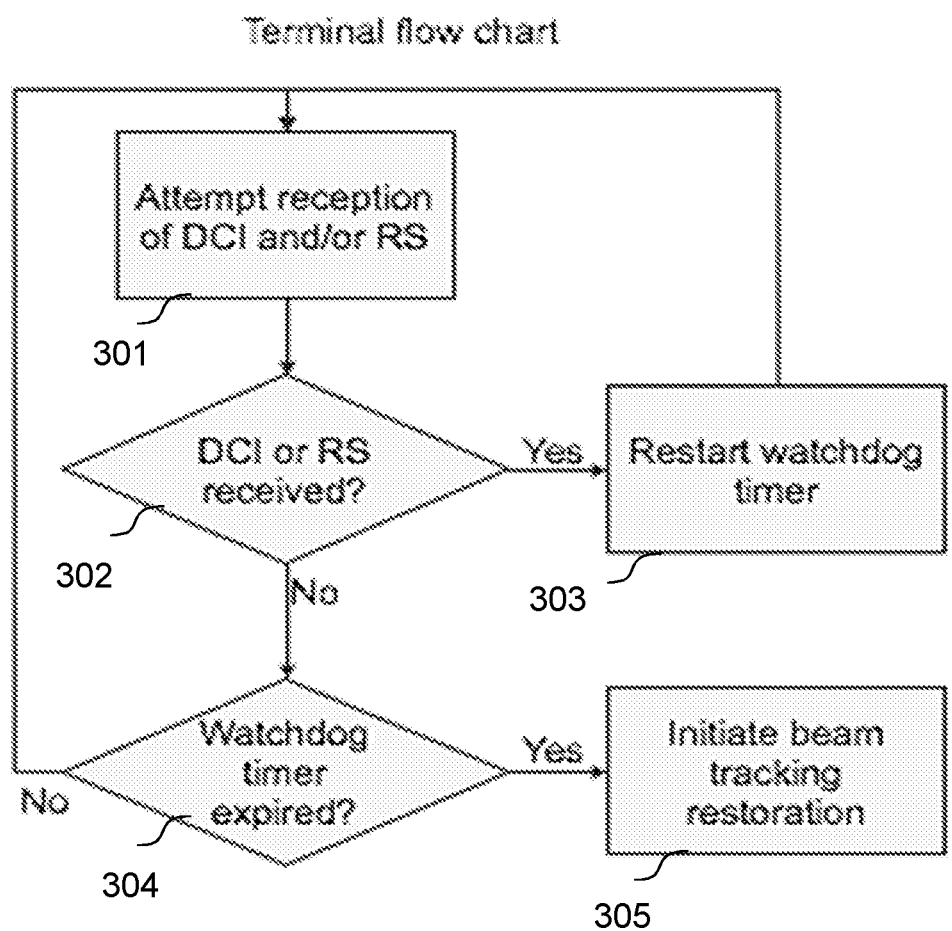

FIG. 3 is a flowchart schematically illustrating procedures relating to a timer and may also be considered to illustrate how some embodiments herein may be implemented in the wireless device, e.g. the wireless device 120. The wireless device may regularly, e.g. continuously and/or or periodically, attempt to receive DCI and/or UE-specific RS. Whenever the DCI or UE-specific RS is received, or received and with sufficient quality, a timer, e.g. a watchdog timer, may be restarted. The timer may not restart, and may thus expire, if the DCI or RS is not received in time or if the RS is received but with insufficient quality. When the timer, e.g. the watchdog timer expires, beam tracking restoration may be initiated.

According to some embodiments herein, a beam-tracking watchdog timer may be introduced in a wireless device, e.g. the wireless device 120, 400, that is operative in a wireless communication network, e.g. the wireless communications network 100, which timer monitors how long time has passed since the wireless device received a signal sent specifically to it by the wireless communication network. Cf. Actions 301 and 302 in FIG. 3, wherein it is shown that the wireless device 120, 400 attempts to receive a DCI or a RS and determines whether or not the DCI or the RS is received. If received, the timer is restarted in Action 303. If not received and when the watchdog timer expires, cf. Action 304 in FIG. 3, the wireless device may initiate e.g. a beam-search procedure, cf. Action 305 in FIG. 3, with the aim of restoring beam tracking. The beam-search procedure may involve the wireless device transmitting a random-access signal to the network and waiting for a response. The wireless communication network may monitor how long time has passed since it made a specific transmission to the receiver, e.g. sent said signal, and may make a new transmission before the watchdog timer would otherwise expire. In some embodiment, a periodic reference signal is transmitted with a periodicity known to the wireless device. As illustrated in Action 303 of FIG. 3, a reception of a new transmission of the signal restarts the timer.

In some embodiments corresponding to a DCI based approach, the signal may be a DCI message, and if there is no useful data to send when the watchdog timer is about to expire, a dummy transmission may be performed by the network to avoid the wireless device initiate and/or entering the beam-search procedure. A watchdog timer value may be adjusted based on how often transmissions are expected to be needed next, i.e. in the future, or may be based on how likely beam tracking is expected to fail. The adjustment may be done implicitly or explicitly by the transmitter sending a new timer value to the receiver. The timer adjustment may also be implicitly accomplished based on other events, e.g. changes in beam tracking.

Said beam-tracking watchdog timer may enable beam-tracking supervision and may allow beam-tracking failure to be quickly detected and beam tracking restored. This allows reliable communication without spending too much resources on the beam tracking. Dynamic timer adjustment allows the beam-tracking supervision to be done without unnecessary overhead.

The beam-tracking watchdog timer may be comprised in a wireless communication device, e.g. the wireless device 120, 400, and may for example be part of a MAC layer. In this case, the timer value may be set by a standard, configured by higher layers, e.g. signaled from the network in a RRC layer, or signaled by a MAC control element from the network. The timer may be disabled with a special and/or specific value, e.g. zero, assigned to have this meaning. Unless otherwise noted or realized from the context, it may be assumed below that the timer is enabled.

The timer may be started or restarted every time a Downlink Control Information (DCI) message is received that is sent specifically to the terminal, cf. Action 303. DCIs are typically received on a Physical Downlink Control CHannel (PDCCH). Examples of DCIs are downlink assignments, typically indicating a downlink data transmission that the wireless device should attempt to receive, and uplink grants, typically indicating that the wireless device should perform an uplink data transmission.

Additionally or alternatively to the above approach that may be named a DCI based approach, an RS based approach may be used. In the RS based approach, the network, e.g. the wireless communications network 100 by means of the network node 110, 500, may transmit to each wireless device, e.g. the wireless device 120, 400, one or more wireless device specific RSs, that may be exemplified by a RS in the following, i.e. RSs that are specific for the wireless device, and should be beamformed and associated with a beamformed DCI in a search space monitored by the wireless device, e.g. with a certain, known periodicity or a maximum periodicity. The periodicity may be configured to the wireless device. The wireless device may thus receive the RS at certain known times that may be specified by a known periodicity. Hence, the wireless device may know that at least this beamformed RS will be present in some subframes, e.g. according to the periodicity that thus may be given, irrespectively of whether the wireless device successfully detects a DCI in this subframe or not. The wireless device may also measure a channel quality using the RS, such as a Signal to Noise Ratio (SNR). The timer may be started and/or restarted when the channel quality is sufficiently good, e.g. the measure is above a certain threshold that may be configured, e.g. by dedicated and/or broadcast signaling, or may be a fixed or specified value that may be predetermined. The channel quality measure may be averaged across multiple transmissions, e.g. corresponding to multiple periods or periodicities and the averaged measure may be compared to the threshold to decide the impact on the watchdog timer start or restart. Hence, if a RS is received but the quality is deemed insufficient, the timer may still not be restarted despite receipt of the RS. Another option is that the time from one transmission to the next is selected to at most a known value that may be set with regard to timeout of the timer.

The wireless device specific RS may be shifted in time and/or subframes for different wireless devices to avoid that the wireless devices start their beam tracking restoration procedure, which may imply an uplink transmission, at the same time. This is beneficial as it avoids excessive load on the uplink from multiple wireless devices in the same subframe.

If the timer expires, the wireless device should attempt to restore beam tracking, e.g. by initiating a beam management procedure, cf. Actions 304 and 305. The first step may be to initiate a beam search to find a beam or beam pair that can be useful for communication. Optionally, if the wireless device already has a beam or beam pair that is estimated to be sufficient good, it may skip the beam search and proceed to a second step immediately. As mentioned above, a beam pair refer to a beam at both ends, e.g. a downlink beam and an uplink beam, such as a network beam and a wireless device beam. In the second step, the wireless device performs a random-access transmission to the network using the found beam or beam pair.

The RS may thus only be received by the wireless device, e.g. the wireless device 120, 400, if the network, e.g. the wireless communications network 100 by means of the network node 110, 500, uses an appropriately chosen beam, else the network will be transmitting this RS without the wireless device being able to receive it or with insufficient quality and the timer may expire and e.g. a beam tracking restore procedure may be initiated. At the same time, the wireless device may be able to receive other transmissions that use other beams and that may be found when restoring beam tracking.

In the DCI based approach, the network may schedules the wireless device so as to avoid unnecessary expiry of the watchdog timer. Thus, the network may monitor the time since the last transmission of a DCI to the terminal, e.g. the wireless device 120, 400. When the timer is near to expire, the network may choose to schedule the terminal to avoid timer expiry, even if there is no data currently needing to be sent to the terminal, i.e. a kind of dummy scheduling. Another option is that the network update the timer setting by sending an updated, e.g. new, such as larger, or the same as before, timer value to the wireless device when the timer is near to expire, thereby restarting the timer and/or extending the timer count. Near to expire may be a time when it is known or at least highly likely that the wireless device will be able to receive and act upon what is sent in an intended manner.

Further, in e.g. the DCI based approach, the timer may be updated based on other events. For instance, when the network is about to switch Network Transmission and Reception point (TRP) for the wireless device, there may be a higher risk of beam-tracking loss. Thus, when the network determines that TRP switching is about to take place, e.g. when there is an indication that this will occur or will likely occur, the network may send a timer value to the terminal that decreases the time for expiry of the timer. Another option is that a shorter timer value, e.g. implicitly, is used by the terminal when, e.g. in response to, that it will switch or switches TRP. Yet another option is that the the timer may be disabled by default and only be enabled when there is a switch of TRP about to take place.

Update the timer value may in the wireless device result in that it replaces an existing timer value with the updated value that then is used directly by the wireless device and an ongoing timer may be restarted without expiry, and/or the new timer value may be used the next time the timer restarts for some other reason.

Figure 8:
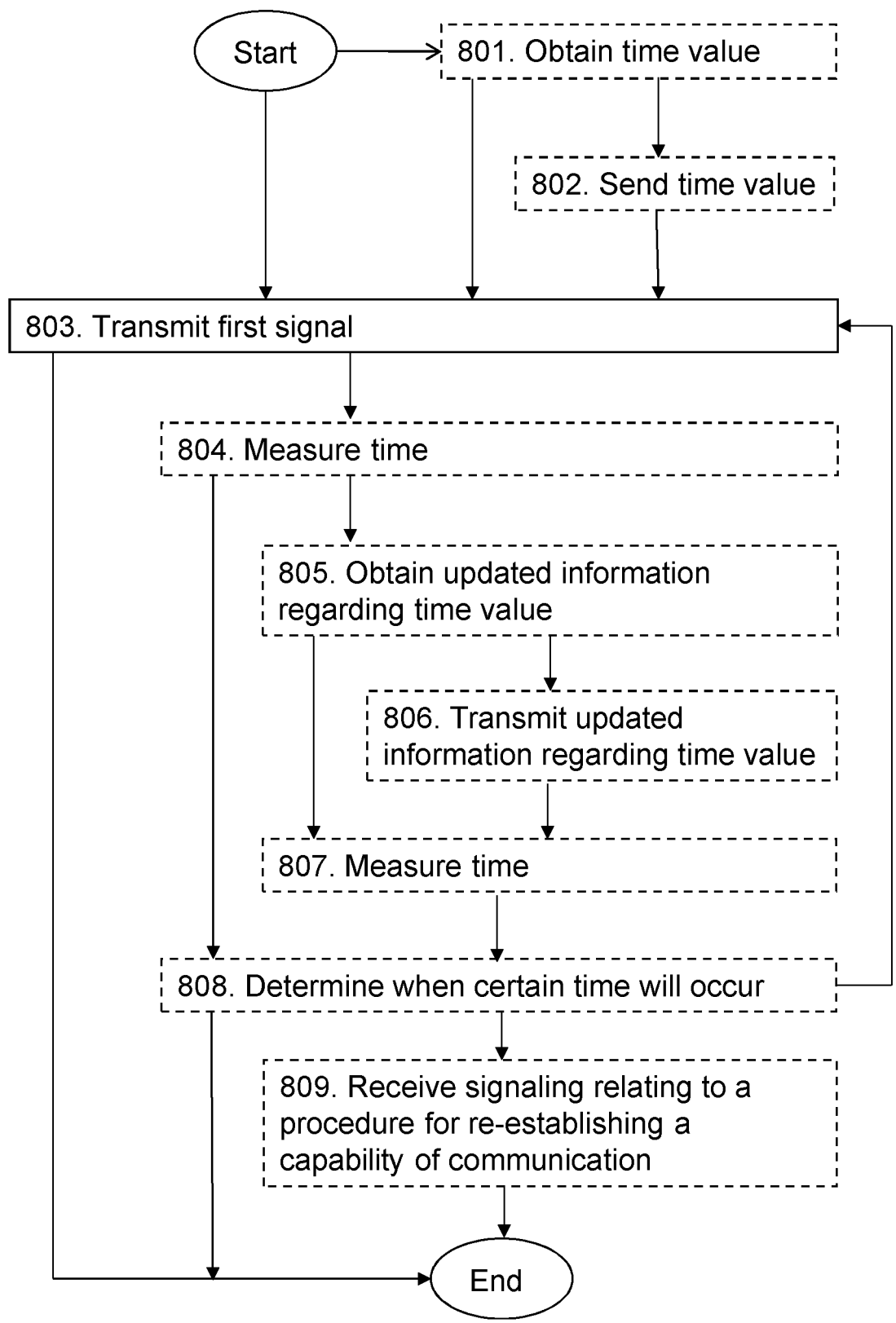

In order to improve the understanding of some embodiments disclosed herein, FIG. 8 will be described before FIGS. 4-6.

An example of a method performed by the radio network node 110 for initiating a procedure for re-establishing a capability of communication in the wireless communications network 100 will now be described with reference to a flowchart depicted in FIG. 8. As mentioned above, the wireless device 120 and the radio network node 110 operate in the wireless communications network 100.

The methods comprise one or more of the following actions. It should be understood that these actions may be taken in any suitable order and that some actions may be combined.

Action 801

In some embodiments, the radio network node 110 obtains a time value. As previously mentioned, the time value may be a time value for count down as time passes or elapses.

As previously mentioned, the time value may be based on expected traffic to and from the wireless device 120.

Alternatively or additionally, the time value may be based on detection that the wireless communications network 100 is about to switch network TRP for the wireless device 120.

This relates to Action 201 previously described.

Action 802

In some embodiments, the radio network node 110 sends the time value to the wireless device 120. Thereby, the wireless device 120 will obtain the time value to be used.

This relates to Action 202 previously described.

Action 803

The radio network node 110 sends, to the wireless device 120, a first signal before a certain time has elapsed since a latest transmission of the first signal, which first signal is specific for the wireless device 120.

As previously mentioned, the first signal may comprise a DCI message or a Reference Signal.

This relates to Action 204 previously described.

Action 804

In some embodiments, the radio network node 110 measures time from the latest transmission of the first signal. Thereby, the radio network node 110 is able to control when to send a new transmission of the first signal in order for the first signal to be received by the wireless device 120 before the certain time has elapsed.

This relates to Action 206 previously described.

Action 805

In some embodiments, the radio network node 110 obtains updated information regarding the time value.

As previously mentioned, the updated information regarding the time value may be based on expected traffic to and from the wireless device 120.

Alternatively or additionally, the updated information regarding the time value may be based on detection that the wireless communications network 100 is about to switch network TRP for the wireless device 120.

This relates to Action 207 previously described.

Action 806

In some embodiments, the radio network node 110 sends, to the wireless device 120, the updated information regarding the time value.

This relates to Action 208 previously described.

Action 807

In some embodiments, the radio network node 110 measures time from the latest transmission of the first signal.

This relates to Action 211 previously described.

Action 808

In some embodiments, the radio network node 110 determines when the certain time will occur based on the obtained time value and on the measured time. Thus, the radio network node 110 may determine whether or not the certain time has passed based on e.g. the obtained time value and on the measured time.

This relates to Action 213 previously described.

Action 809

In some embodiments, the radio network node 110 receives, from the wireless device 120, signaling relating to a procedure for re-establishing a capability of communication between the wireless device 120 and the radio network node 110 using a beam pair.

This relates to Action 214 previously described wherein the wireless device 120 initiates a beam management procedure such as a procedure for re-establishing a capability of communication between the wireless device 120 and the radio network node 110 using a beam pair.

Figure 4:
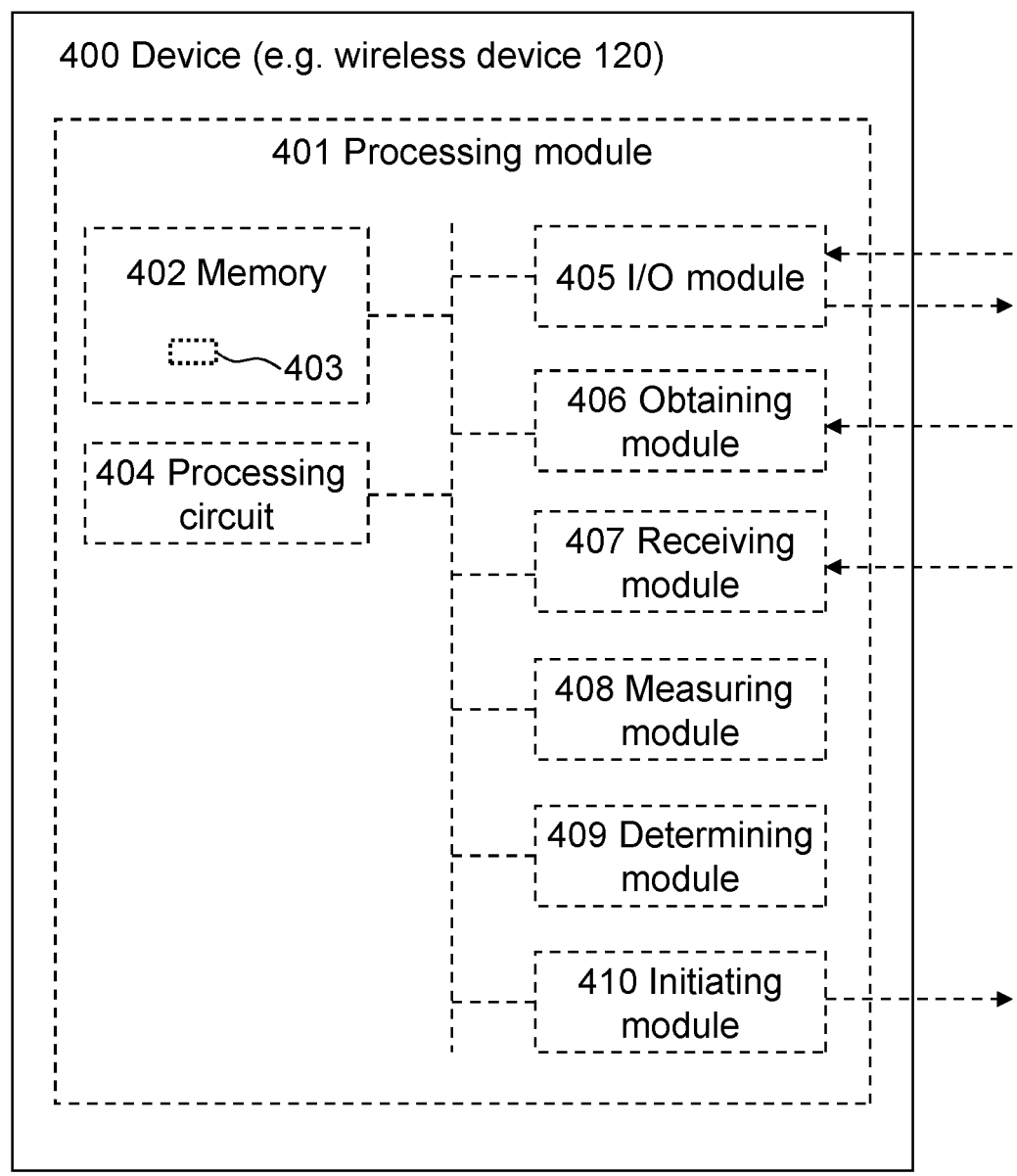
Figure 5:
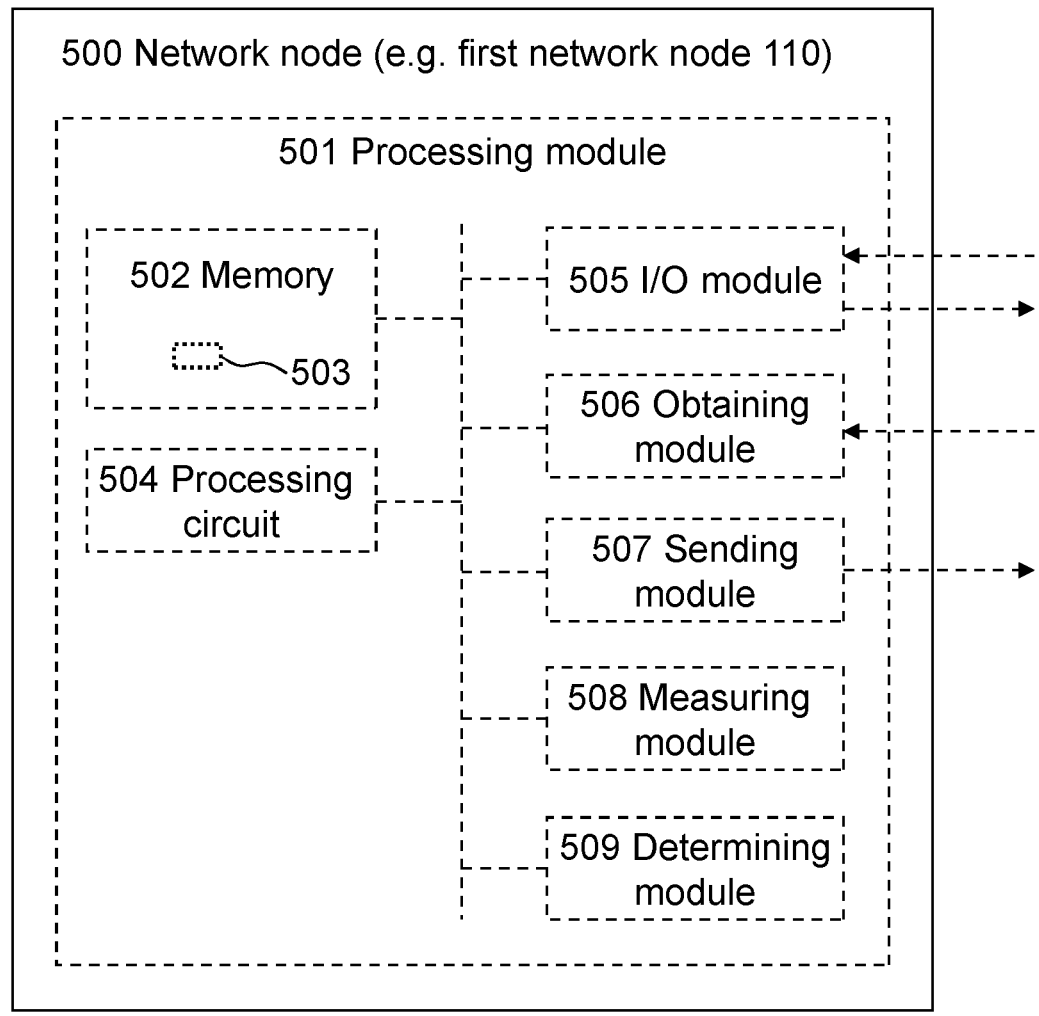

FIGS. 4 and 5 are schematic block diagrams for illustrating embodiments of a device 400, that e.g. may be the wireless device 120, and a network node 500 that e.g. may be the first radio network node 110, and how these respectively may be configured to perform the methods and/or one or more actions described herein e.g. relating to respective node, e.g. for being performed by, respective node. Hence, the device 400 and the network node 500, respectively, may comprise:

A processing module 401, 501, such as a means, one or more hardware modules, including e.g. one or more processors, and/or one or more software modules for performing said methods and/or actions.

A memory 402, 502, which may comprise, such as contain or store, a computer program 403, 503. The computer program comprises 'instructions' or 'code' directly or indirectly executable by the respective node so that it performs the said methods and/or actions. The memory may comprise one or more memory units and may be further be arranged to store data, such as configurations and/or applications involved in or for performing functions and actions of embodiments herein.

A processing circuit 404, 504, as an exemplifying hardware module and may comprise or correspond to one or more processors. In some embodiments, the processing module may comprise, e.g. 'is embodied in the form of' or 'realized by' the processing circuit. In these embodiments, the memory may comprise the computer program executable by the processing circuit, whereby the node comprising it is operative, or configured, to perform said method and/or actions.

An Input/Output (I/O) module 405, 505, configured to be involved in, e.g. by performing, any communication to and/or from other units and/or nodes, such as sending and/or receiving information to and/or from other external nodes or devices. The I/O module may be exemplified by an obtaining, e.g. receiving, module and/or a sending module, when applicable.

Each node 400, 500 may also comprise other exemplifying hardware and/or software module(s) as may have been described elsewhere in the present disclosure, which module (s) may be fully or partly implemented by the respective processing circuit.

Thus, to perform the method for initiating a procedure for re-establishing a capability of communication in a wireless communications network 100, the wireless device 120, 400 may be configured according to an arrangement depicted in FIG. 4. As previously described, the wireless device 120, 400 and the radio network node 110, 500 are configured to operate in the wireless communications network 100.

As previously mentioned, the wireless device 120,400 comprises the input and/or output module 405 configured to communicate with one or more wireless devices, and/or one or more network nodes, e.g. the radio network node 110, 500. The input and/or output module 405 may comprise a wireless receiver (not shown) and a wireless transmitter (not shown).

The wireless device 120, 400 is configured to obtain, by means of an obtaining module 406 configured to obtain, a time value. The obtaining module 406 may be implemented by or arranged in communication with the processing module 401 and/or by the processing circuit 404 of the wireless device 120, 400.

In some embodiments, the wireless device 120 is configured to obtain a time value.

The wireless device 120 may be configured to obtain updated information regarding the time value.

As previously mentioned, the time value and/or the updated information regarding the time value may be based on detection that the wireless communications network 100 is about to switch network TRP for the wireless device 120.

As also previously mentioned, the time value and/or the updated information regarding the time value may be based on expected traffic to and from the wireless device 120.

The wireless device 120 may obtain the updated information by receiving the updated information from the radio network node 110. In such embodiments, the receipt of the updated information restarts the time measurement. Thus, the wireless device 120 may be configured to restart the time measurement when in receipt of the updated information.

The wireless device 120, 400 is configured to receive, by means of a receiving module 407 configured to receive, a transmission, e.g. a data packet, a signal or information, from one or more network nodes, e.g. the network node 110, 500 and/or to one or more other wireless devices. The receiving module 407 may be implemented by or arranged in communication with the processing module 401 and/or by the processing circuit 404 of the wireless device 120, 400.

The wireless device 120 is configured to receive, from the radio network node 110, a first signal that is specific for the wireless device 120.

As previously mentioned, the first signal may comprise a DCI message or a Reference Signal.

The wireless device 120, 400 is configured to measure, by means of a measuring module 408 configured to measure time, e.g. a time period. The measuring module 408 may be implemented by or arranged in communication with the processing module 401 and/or by the processing circuit 404 of the wireless device 120, 400.

In some embodiments, the wireless device 120 is configured to measure time from the latest receipt of the first signal.

The wireless device 120, 400 is configured to determine, by means of a determining module 409 configured to determine, whether or not a time, or a time period, has elapsed. The determining module 409 may be implemented by or arranged in communication with the processing module 401 and/or by the processing circuit 404 of the wireless device 120, 400.

In some embodiments, the wireless device 120 is configured to determine whether or not the certain time has elapsed based on the obtained time value and the measured time.

In some embodiments, wherein the wireless device 120 is configured to obtain updated information regarding the time value, the wireless device 120 is further configured to determine whether or not the certain time has elapsed based on the updated information regarding the time value.

The wireless device 120, 400 is configured to initiate, by means of an initiating module 410 configured to initiate, a procedure for re-establishing a capability of communication in the wireless communications network 100. The initiating module 410 may be implemented by or arranged in communication with the processing module 401 and/or by the processing circuit 404 of the wireless device 120, 400.

The wireless device 120 is configured to initiate a procedure for re-establishing a capability of communication between the wireless device 120 and the radio network node 110 using a beam pair. The wireless device 120 is configured to initiate the procedure in response to that a certain time has elapsed since a latest receipt of the first signal.

Further, to perform the method for initiating a procedure for re-establishing a capability of communication in a wireless communications network 100, the radio network node 110, 500 may be configured according to an arrangement depicted in FIG. 5. As previously described, the wireless device 120, 400 and the radio network node 110, 500 are configured to operate in the wireless communications network 100.

As previously mentioned, the radio network node 110, 500 comprises the input and/or output module 505 configured to communicate with one or more wireless devices, e.g. the wireless device 120, 400 and/or one or more other network nodes. The input and/or output module 505 may comprise a wireless receiver (not shown) and a wireless transmitter (not shown).

The radio network node 110, 500 is configured to obtain, by means of an obtaining module 506 configured to obtain, a time value. The obtaining module 506 may be implemented by or arranged in communication with the processing module 501 and/or by the processing circuit 504 of the radio network node 110, 500.

In some embodiments, the radio network node 110, 500 is configured to obtain updated information regarding the time value.

As previously mentioned, the time value and/or the updated information regarding the time value may be based on detection that the wireless communications network 100 is about to switch network TRP for the wireless device 120.

As also previously mentioned, the time value and/or the updated information regarding the time value may be based on expected traffic to and from the wireless device 120.

The radio network node 110, 500 is configured to send, by means of a sending module 507 configured to send, a transmission, e.g. a data packet, a signal or information, to the wireless device 120, 400. The sending module 507 may be implemented by or arranged in communication with the processing module 501 and/or by the processing circuit 504 of the radio network node 110, 500.

The radio network node 110, 500 is configured to send, to the wireless device 120, a first signal before a certain time has elapsed since a latest transmission of the first signal, which first signal is specific for the wireless device 120.

As previously mentioned, the first signal may comprise a DCI message or a Reference Signal.

In some embodiments, the radio network node 110, 500 is configured to send, to the wireless device 120, the updated information regarding the time value.

The radio network node 110, 500 is configured to measure, by means of a measuring module 508, time, e.g. a time period. The measuring module 508 may be implemented by or arranged in communication with the processing module 501 and/or by the processing circuit 504 of the radio network node 110, 500.

In some embodiments, the radio network node 110, 500 is configured to measure time from the latest transmission of the first signal.

The network node 110, 500 is configured to determine, by means of a determining module 509 configured to determine, whether or not a time, or a time period, has elapsed. The determining module 509 may be implemented by or arranged in communication with the processing module 501 and/or by the processing circuit 504 of the network node 110, 500.

In some embodiments, the radio network node 110, 500 is configured to determine when the certain time will occur based on the obtained time value and on the measured time.

Figure 6A:
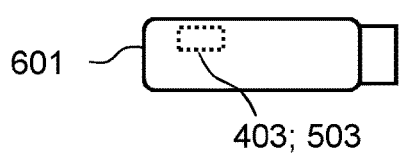
FIGS. 6A-6C are schematic drawings illustrating embodiments of a computer-readable medium.
Figure 6B:
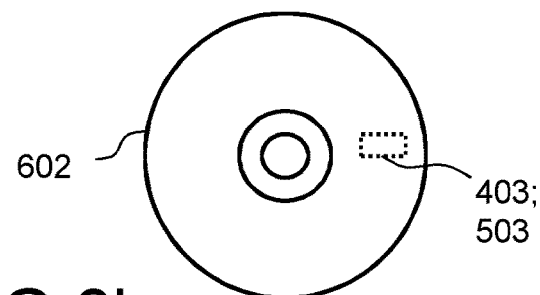
Figure 6C:
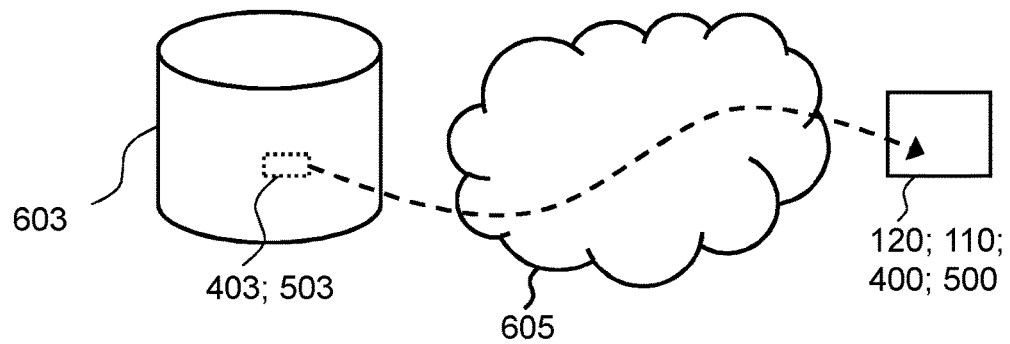

FIGS. 6a-c are schematic drawings illustrating embodiments relating to a computer program that may be any one of the computer programs 403, 503, and that comprises instructions that when executed by the respective processing circuit causes the node comprising it to perform the respective method as described above.

In some embodiments there is provided a computer program product, i.e. a data carrier, comprising a computer-readable medium and the computer program stored on the computer-readable medium. By computer readable medium may be excluded a transitory, propagating signal and the computer readable medium may correspondingly be named non-transitory computer readable medium. Non-limiting examples of the computer-readable medium is a memory card or a memory stick 601 as in FIG. 6a, a disc storage medium 602 such as a CD or DVD as in FIG. 6b, a mass storage device 603 as in FIG. 6c. The mass storage device is typically based on hard drive(s) or Solid State Drive(s) (SSD). The mass storage device may be such that is used for storing data accessible over a computer network 605, e.g. the Internet or a Local Area Network (LAN).

The computer programs, respectively, may furthermore be provided as a pure computer program or comprised in a file or files. The file or files may be stored on the computer-readable medium and e.g. available through download e.g. over the computer network, such as from the mass storage device via a server. The server may e.g. be a web or File Transfer Protocol (FTP) server. The file or files may e.g. be executable files for direct or indirect download to and execution on the a node for carrying out a method, e.g. by the processing circuit, or may be for intermediate download and compilation to make them executable before further download and execution causing the node(s) to perform the respective method as described above.

Note that any processing module(s) mentioned in the foregoing may be implemented as a software and/or hardware module, e.g. in existing hardware and/or as an Application Specific integrated Circuit (ASIC), a field-programmable gate array (FPGA) or the like. Also note that any hardware module(s) and/or circuit(s) mentioned in the foregoing may e.g. be included in a single ASIC or FPGA, or be distributed among several separate hardware components, whether individually packaged or assembled into a System-on-a-Chip (SoC).

Those skilled in the art will also appreciate that the modules and circuitry discussed herein may refer to a combination of hardware modules, software modules, analog and digital circuits, and/or one or more processors configured with software and/or firmware, e.g. stored in memory, that, when executed by the one or more processors make the first node and the second node to be configured to and/or to perform the above-described methods, respectively, and/or actions thereof.

Identification by any identifier herein may be implicit or explicit. The identification may be unique in the wireless communication network 100 or at least in a part or some area thereof.

The term "network", or simply "NW", as used herein typically, as should be realized without any information on the contrary, refer to the wireless communication network 100.

The term UE, terminal or MS, as may be used herein typically, as should be realized without any information on the contrary, refer to the wireless device 120.

The term "network node" as used herein may as such refer to any type of radio network node (described below) or any network node, which may communicate with at least a radio network node. Examples of such network nodes include any radio network node stated above, a core network node, Operations & Maintenance (O&M), Operations Support Systems (OSS), Self-Organizing Network (SON) node, positioning node etc.

The term "radio network node" as used herein may as such refer to any type of network node serving a wireless device and/or that are connected to other network node(s) or network element(s) or any radio node from which a wireless device receives signals. Examples of radio network nodes are Node B, Base Station (BS), Multi-Standard Radio (MSR) node such as MSR BS, eNB, eNodeB, network controller, RNC, Base Station Controller (BSC), relay, donor node controlling relay, Base Transceiver Station (BTS), Access Point (AP), transmission points, transmission nodes, nodes in distributed antenna system (DAS) etc.

The term "communication device" or "wireless' device" as used herein, may as such refer to any type of device arranged to communicate, e.g. with a radio network node, in a wireless, cellular and/or mobile communication system, such as the wireless communication network 100, and may thus be a wireless communication device. Examples include: target devices, device to device UE, device for Machine Type of Communication (MTC), MTC device, machine type UE or UE capable of machine to machine (M2M) communication, Personal Digital Assistant (PDA), iPAD, Tablet, mobile terminals, smart phone, Laptop Embedded Equipment (LEE), Laptop Mounted Equipment (LME), Universal Serial Bus (USB) dongles etc. While said terms are used frequently herein for convenience, or in the context of examples involving other 3GPP nomenclature, it must be appreciated that the term as such is non-limiting and the teachings herein apply to essentially any type of wireless device.

The term "node" as used herein may as such refer to any type of network node or wireless device, such as described above.

Note that although terminology used herein may be particularly associated with and/or exemplified by certain cellular communication systems, wireless communication networks etc., depending on terminology used, such as wireless communication networks based on 3GPP, this should as such not be seen as limiting the scope of the embodiments herein to only such certain systems, networks etc.

As used herein, the term "memory" may refer to a hard disk, a magnetic storage medium, a portable computer diskette or disc, flash memory, random access memory (RAM) or the like. Furthermore, the memory may be an internal register memory of a processor.

Also note that any enumerating terminology such as first network node, second network node, first base station, second base station, or similar, that may have been used herein, as such should be considering non-limiting and the terminology as such does not imply a certain hierarchical relation. Without any explicit information in the contrary, naming by enumeration should be considered merely a way of accomplishing different names.

| Abbreviation | Explanation |
| --- | --- |
| DCI | Downlink Control Information (message) |
| MAC | Medium Access Control |
| NW | Network |
| PDCCH | Physical Downlink Control Channel |
| RRC | Radio Resource Control |
| RS | Reference Signal |
| SNR | Signal to Noise Ratio |
| TRP | Transmission and Reception Point |
| UE | User Equipment |

The invention claimed is:

1. A method performed by a wireless device for initiating a procedure for re-establishing a capability of communication in a wireless communications network, wherein the wireless device and a radio network node operate in the wireless communications network; and wherein the method comprises:
receiving, from the radio network node, a first signal that is specific for the wireless device; and
in response to that a certain time has elapsed since a latest receipt of the first signal, initiating the procedure for re-establishing the capability of communication between the wireless device and the radio network node using a beam pair.

2. The method of claim 1, comprising:
obtaining a time value;
measuring time from the latest receipt of the first signal; and
determining whether or not the certain time has elapsed based on the obtained time value and the measured time.

3. The method of claim 2, comprising:
obtaining updated information regarding the time value; and
determining whether or not the certain time has elapsed based on the updated information regarding the time value.

4. The method of claim 3, wherein receipt of the updated information restarts the time measurement.

5. The method of claim 2, wherein the time value and/or the updated information regarding the time value is based on detection that the wireless communications network is about to switch network Transmission and Reception Point, TRP, for the wireless device.

6. The method of claim 2, wherein the time value and/or the updated information regarding the time value are based on expected traffic to and from the wireless device.

7. The method of claim 1, wherein the first signal comprises a Downlink Control Information, DCI, message or a Reference Signal.

8. Non-transitory computer readable storage medium comprising a computer program, comprising instructions which, when executed on at least one processor, causes the at least one processor to carry out the method according to claim 1.

9. A method performed by a radio network node for initiating a procedure for re-establishing a capability of communication in a wireless communications network, wherein the radio network node and the wireless device operate in the wireless communications network; and wherein the method comprises:
sending, to the wireless device, a first signal before a certain time has elapsed since a latest transmission of the first signal, which first signal is specific for the wireless device; and
receiving, from the wireless device, signalling relating to initiation of the procedure for re-establishing the capability of communication between the wireless device and the radio network node using a beam pair.

10. The method of claim 9, comprising:
obtaining a time value,
measuring time from the latest transmission of the first signal; and
determining when the certain time will occur based on the obtained time value and on the measured time.

11. The method of claim 10, wherein the time value and/or the updated information regarding the time value are based on expected traffic to and from the wireless device.

12. The method of claim 9, comprising:
obtaining updated information regarding the time value; and
sending, to the wireless device, the updated information regarding the time value.

13. The method of claim 9, wherein the time value and/or the updated information regarding the time value is based on detection that the wireless communications network is about to switch network Transmission and Reception Point, TRP, for the wireless device.

14. The method of claim 9, wherein the first signal comprises a Downlink Control Information, DCI, message or a Reference Signal.

15. A wireless device for initiating a procedure for re-establishing a capability of communication in a wireless communications network, wherein the wireless device and a radio network node are configured to operate in the wireless communications network; and wherein the wireless device is configured to:
receive, from the radio network node, a first signal that is specific for the wireless device; and
in response to that a certain time has elapsed since a latest receipt of the first signal, initiate the procedure for re-establishing the capability of communication between the wireless device and the radio network node using a beam pair.

16. The wireless device of claim 15, configured to:
obtain a time value;
measure time from the latest receipt of the first signal; and
determine whether or not the certain time has elapsed based on the obtained time value and the measured time.

17. The wireless device of claim 16, configured to:
obtain updated information regarding the time value; and
determine whether or not the certain time has elapsed based on the updated information regarding the time value.

18. The wireless device of claim 17, wherein receipt of the updated information restarts the time measurement.

19. The wireless device of claim 16, wherein the time value and/or the updated information regarding the time value is based on detection that the wireless communications network is about to switch network Transmission and Reception Point, TRP, for the wireless device.

20. The wireless device of claim 16, wherein the time value and/or the updated information regarding the time value are based on expected traffic to and from the wireless device.

21. The wireless device of claim 13, wherein the first signal comprises a Downlink Control Information, DCI, message or a Reference Signal.

22. A radio network node for initiating a procedure for re-establishing a capability of communication in a wireless communications network, wherein the radio network node and the wireless device are configured to operate in the wireless communications network; and wherein the radio network node is configured to:

send, to the wireless device, a first signal before a certain time has elapsed since a latest transmission of the first signal, which first signal is specific for the wireless device; and receive, from the wireless device, signalling related to initiation of the procedure for re-establishing the capability of communication between the wireless device and the radio network node using a beam pair.

23. The radio network node of claim 22, configured to: obtain a time value;

measure time from the latest transmission of the first signal; and determine when the certain time will occur based on the obtained time value and on the measured time.

24. The radio network node of claim 23, wherein the time value and/or the updated information regarding the time value are based on expected traffic to and from the wireless device.

25. The radio network node of claim 22, configured to: obtain updated information regarding the time value; and send, to the wireless device, the updated information regarding the time value.

26. The radio network node of claim 23, wherein the time value and/or the updated information regarding the time value is based on detection that the wireless communications network is about to switch network Transmission and Reception Point, TRP, for the wireless device.

27. The radio network node of claim 22, wherein the first signal comprises a Downlink Control Information, DCI, message or a Reference Signal.

* * * * *